United States Patent
Chifor et al.

(10) Patent No.: US 11,425,124 B2
(45) Date of Patent: Aug. 23, 2022

(54) METHOD FOR CLOUD ASSISTED AUTHORIZATION OF IOT IDENTITY BOOTSTRAPPING

(71) Applicant: LENOVO Enterprise Solutions (Singapore) PTE. LTD., New Tech Park (SG)

(72) Inventors: Bogdan Chifor, Nojorid (RO);
George-Andrei Stanescu, Ilfov (RO);
Radu Iorga, Bucharest (RO);
Corneliu-Ilie Calciu, Bucharest (RO)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 298 days.

(21) Appl. No.: 16/915,821

(22) Filed: Jun. 29, 2020

(65) Prior Publication Data
US 2021/0409399 A1  Dec. 30, 2021

(51) Int. Cl.
*H04L 29/06* (2006.01)
*H04L 9/40* (2022.01)

(52) U.S. Cl.
CPC ...... *H04L 63/0876* (2013.01); *H04L 63/0823* (2013.01); *H04L 63/0884* (2013.01); *H04L 63/10* (2013.01)

(58) Field of Classification Search
CPC ............. H04L 63/0823; H04L 63/0876; H04L 63/0884; H04L 63/10; H04L 69/324; H04L 69/326; G16Y 10/75; G16Y 40/50
See application file for complete search history.

(56) References Cited

U.S. PATENT DOCUMENTS 10,602,353 B1 * 3/2020 Berdy ................... H04W 12/35
11,025,437 B2 * 6/2021 Loreskar ............. H04L 63/0823
(Continued)

OTHER PUBLICATIONS

Arun Venkataramani et al., MobilityFirst: A Mobility-Centric and Trustworthy Internet Architecture, Jul. 2014, ACM, vol. 44, Issue 3, pp. 74-80. (Year: 2014).*

(Continued)

*Primary Examiner* — Jeffrey C Pwu
*Assistant Examiner* — Fahimeh Mohammadi
(74) *Attorney, Agent, or Firm* — Kunzler Bean & Adamson; Bruce R. Needham

(57) ABSTRACT

A method for authorization of internet of things ("IoT") identity bootstrapping includes receiving from a device, at a network access server ("NAS") of a user and in response to an attestation request sent to the device, a vendor network address of a vendor server of a vendor and a device identifier for the device. The method includes authenticating the vendor using the vendor network address and, in response to authenticating the vendor, sending the device identifier to the vendor server. The method includes communicating device attestation packets between the vendor server and the device. The device attestation packets validate the device to the vendor server. The method includes receiving device attestation from the vendor server. The device attestation indicating validity status of the device to the NAS. The method includes, in response to the device attestation indicating validity of the device, transmitting a new device identity to the device.

13 Claims, 9 Drawing Sheets

(56) References Cited

U.S. PATENT DOCUMENTS

| | | | | |
|---|---|---|---|---|
| 2010/0313242 | A1* | 12/2010 | Sato | H04L 12/4641 |
| | | | | 726/3 |
| 2017/0353859 | A1* | 12/2017 | Idnani | H04W 12/08 |
| 2018/0131689 | A1* | 5/2018 | Vasters | H04W 12/06 |
| 2018/0167866 | A1* | 6/2018 | Walter | H04L 63/0876 |
| 2018/0198604 | A1* | 7/2018 | Hayton | G06F 21/73 |
| 2018/0314808 | A1* | 11/2018 | Casey | H04W 4/02 |
| 2019/0026710 | A1* | 1/2019 | Chow | H04L 67/567 |
| 2019/0228144 | A1* | 7/2019 | Kermes | H04L 63/0861 |
| 2020/0177589 | A1* | 6/2020 | Mangalvedkar | H04L 63/0876 |
| 2020/0322334 | A1* | 10/2020 | Sheth | H04L 63/0876 |
| 2021/0014683 | A1* | 1/2021 | Obaidi | H04L 63/0823 |

OTHER PUBLICATIONS

Meriem Bettayeb et al., Firmware Update Attacks and Security for IoT Devices, Mar. 2019, ACM, pp. 1-6. (Year: 2019).*

Jun Li et al., Enabling Internet-of-Things Services in the MobilityFirst Future Internet Architecture, Aug. 9, 2012, IEEE, pp. 1-6. (Year: 2012).*

Pieter Maene et al., Hardware-Based Trusted Computing Architectures for Isolation and Attestation, Mar. 1, 2018, IEEE, vol. 67, Issue: 3, pp. 361-374. (Year: 2018).*

Stajano, et al., "The Resurrecting Duckling: Security Issues for Ad-hoc Wireless Networks", University of Cambridge Computer Laboratory, pp. 1-11.

Aura, et al., "Nimble out-of-band authentication for EAP (EAP-NOOB)", Network Working Group, Oct. 29, 2019, pp. 1-62.

* cited by examiner

METHOD FOR CLOUD ASSISTED AUTHORIZATION OF IOT IDENTITY BOOTSTRAPPING

FIELD

The subject matter disclosed herein relates to internet of things ("IoT") devices and more particularly relates to cloud assisted authorization of IoT identity bootstrapping.

BACKGROUND

IoT devices from regular consumer scenarios, like smarthome, are not equipped with a digital identity of a network access server ("NAS"). Before being permitted access to the user network, the IoT device can be imprinted with a digital identity (e.g. cryptographic keys). This scenario raises a security issue, because the IoT device must authorize the user before accepting a new digital identity and the user must attest the validity of the IoT device before allowing access into the local network.

BRIEF SUMMARY

A method for cloud assisted authorization of IoT identity bootstrapping is disclosed. An alternate method and computer program product also perform the functions of the apparatus. The method for cloud assisted authorization of IoT identity bootstrapping includes receiving from a device, at a NAS of a user and in response to an attestation request sent from the NAS to the device, a vendor network address of a vendor server of a vendor and a device identifier for the device. The device is capable of connection to a computer network accessible by the NAS. The method includes authenticating the vendor using the vendor network address and, in response to authenticating the vendor, sending the device identifier to the vendor server. The method includes communicating device attestation packets between the vendor server and the device. Contents of a payload of the device attestation packets are inaccessible to the NAS and the device attestation packets validate the device to the vendor server. The method includes receiving device attestation from the vendor server. The device attestation indicating validity status of the device to the NAS. The method includes, in response to the device attestation indicating validity of the device, transmitting a new device identity to the device.

Another method for cloud assisted authorization of IoT identity bootstrapping includes maintaining a device in a locked state. The device is connected to a NAS of a user and the locked state prevents acceptance of a new device identity from the NAS prior to verifying authorization of the user. The method includes receiving a new device identity from the NAS and, in response to receiving the new device identity from the NAS, transmitting to the NAS a vendor network address of a vendor server of a vendor and a device identifier of the device. The method includes communicating user authorization packets with the vendor server through the NAS where contents of a payload of the user authorization packets are inaccessible to the NAS and, in response to receiving from the vendor server an indication of user authorization, transmitting a notification to the NAS that the device has accepted the new device identity and proceeding with a network identity bootstrap process with the NAS.

A program product for cloud assisted authorization of IoT identity bootstrapping includes a computer readable storage medium with program code. The program code is configured to be executable by a processor to perform operations that include receiving from a device, at a NAS of a user and in response to an attestation request sent from the NAS to the device, a vendor network address of a vendor server of a vendor and a device identifier for the device. The device is capable of connection to a computer network accessible by the NAS. The program code is also configured to perform operations that include authenticating the vendor using the vendor network address and, in response to authenticating the vendor, sending the device identifier to the vendor server. The program code is also configured to perform operations that include communicating device attestation packets between the vendor server and the device. Contents of a payload of the device attestation packets are inaccessible to the NAS and the device attestation packets validate the device to the vendor server. The program code is also configured to perform operations that include receiving device attestation from the vendor server, where the device attestation indicates validity status of the device to the NAS and, in response to the device attestation indicating validity of the device, transmitting a new device identity to the device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
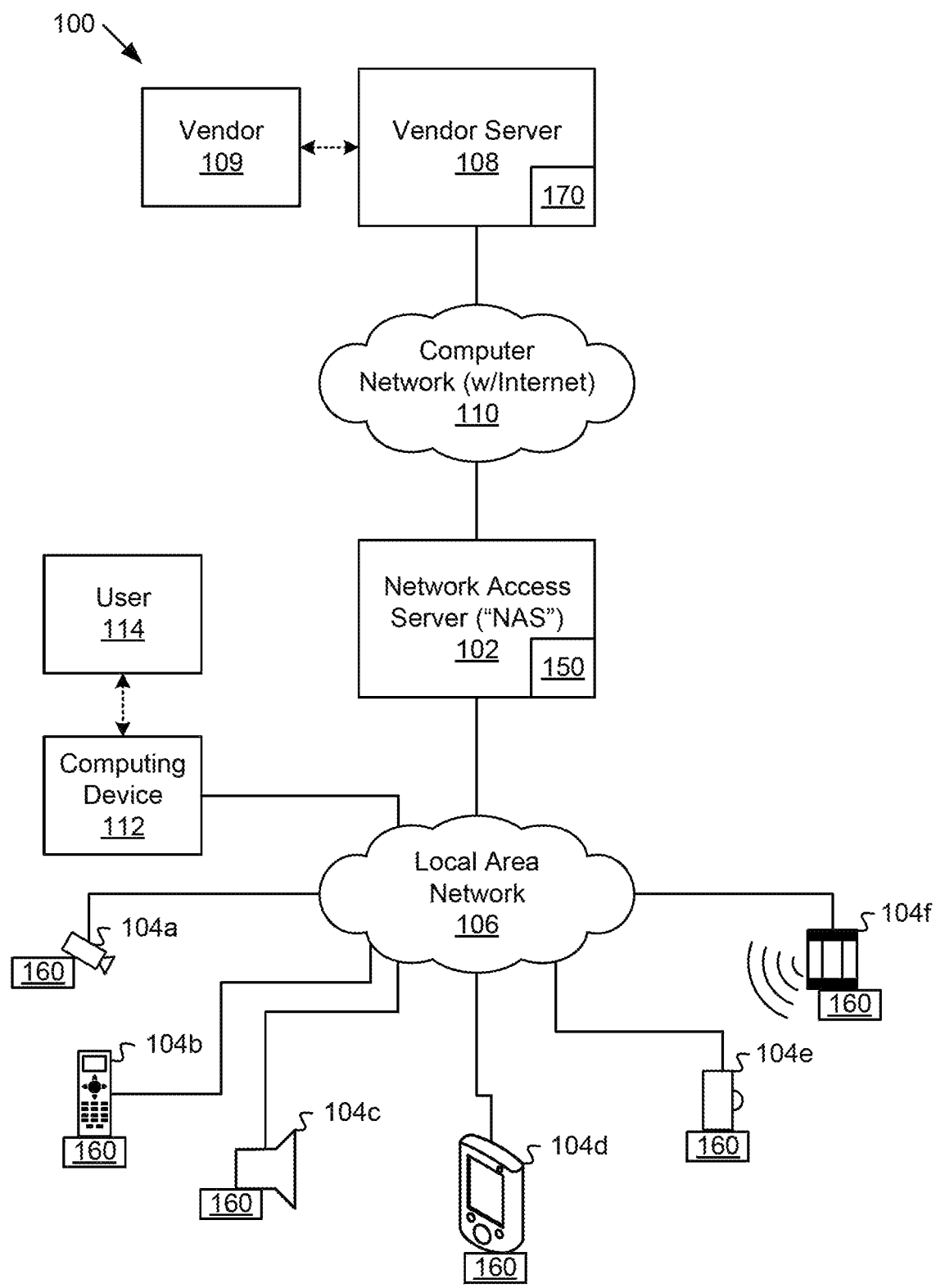
FIG. 1 is a schematic block diagram illustrating one embodiment of a system for cloud assisted authorization of internet of things ("IoT") identity bootstrapping.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for cloud assisted authorization of IoT identity bootstrapping is disclosed. An alternate method and computer program product also perform the functions of the apparatus. The method for cloud assisted authorization of IoT identity bootstrapping includes receiving from a device, at a NAS of a user and in response to an attestation request sent from the NAS to the device, a vendor network address of a vendor server of a vendor and a device identifier for the device. The device is capable of connection to a computer network accessible by the NAS. The method includes authenticating the vendor using the vendor network address and, in response to authenticating the vendor, sending the device identifier to the vendor server. The method includes communicating device attestation packets between the vendor server and the device. Contents of a payload of the device attestation packets are inaccessible to the NAS and the device attestation packets validate the device to the vendor server. The method includes receiving device attestation from the vendor server. The device attestation indicating validity status of the device to the NAS. The method includes, in response to the device attestation indicating validity of the device, transmitting a new device identity to the device.

In some embodiments, the device and the NAS communicate over a link layer and the NAS and the vendor server communicate using an Internet protocol over a computer network. In other embodiments, the device is in a locked state and does not accept a new device identity prior to the vendor server validating the user to the device. In a further embodiment, validating the user to the device includes communicating user authorization packets between the vendor server and the device, where contents of a payload of each user authorization packet are inaccessible to the NAS, receiving notification from the device that the new device identity has been accepted by the device, and proceeding with a network identity bootstrap process for the device. In a further embodiment, the method includes, in response to the vendor server communicating user non-authorization to the device, receiving notification from the device that the new device identity has not been accepted by the device where the network identity bootstrap process for the device is halted.

In some embodiments, in response to the device attestation including an indication of invalidity of the device, the method includes preventing transmission of the new device identity to the device. In other embodiments, authenticating the vendor using the vendor network address includes the NAS communicating with the vendor server using a security protocol and/or verifying a digital certificate of the vendor. In other embodiments, validating the device to the vendor server includes the vendor server verifying that the device has a device identity known to the vendor server as a valid device identity. In other embodiments, the NAS includes a network communication device connected to the Internet and a communication port connected to the device using a link layer protocol. In other embodiments, the vendor network address of the vendor server comprises a uniform resource identifier ("URI").

Another method for cloud assisted authorization of IoT identity bootstrapping includes maintaining a device in a locked state. The device is connected to a NAS of a user and the locked state prevents acceptance of a new device identity from the NAS prior to verifying authorization of the user. The method includes receiving a new device identity from the NAS and, in response to receiving the new device identity from the NAS, transmitting to the NAS a vendor network address of a vendor server of a vendor and a device identifier of the device. The method includes communicating user authorization packets with the vendor server through the NAS where contents of a payload of the user authorization packets are inaccessible to the NAS and, in response to receiving from the vendor server an indication of user authorization, transmitting a notification to the NAS that the device has accepted the new device identity and proceeding with a network identity bootstrap process with the NAS.

In some embodiments, the method includes, prior to receiving the new device identity from the NAS, receiving a device attestation request from the NAS and transmitting to the NAS the vendor network address and the device identifier of the device. In some embodiments, the method includes, prior to communicating user authorization packets with the vendor server, communicating device attestation packets with the vendor server through the NAS. Contents of a payload of the device attestation packets are inaccessible to the NAS and the device attestation packets validate the device to the vendor server. The NAS transmits the new device identity in response to the vendor server validating the device.

In some embodiments, the method includes, in response to receiving from the vendor server an indication of user non-authorization, transmitting a notice to the NAS that the device has not accepted the new device identity. In other embodiments, the device and the NAS communicate over a link layer and the NAS and the vendor server communicate using an Internet protocol.

A program product for cloud assisted authorization of IoT identity bootstrapping includes a computer readable storage medium with program code. The program code is configured to be executable by a processor to perform operations that include receiving from a device, at a NAS of a user and in response to an attestation request sent from the NAS to the device, a vendor network address of a vendor server of a vendor and a device identifier for the device. The device is capable of connection to a computer network accessible by the NAS. The program code is also configured to perform operations that include authenticating the vendor using the vendor network address and, in response to authenticating the vendor, sending the device identifier to the vendor server. The program code is also configured to perform operations that include communicating device attestation packets between the vendor server and the device. Contents of a payload of the device attestation packets are inaccessible to the NAS and the device attestation packets validate the device to the vendor server. The program code is also configured to perform operations that include receiving device attestation from the vendor server, where the device attestation indicates validity status of the device to the NAS and, in response to the device attestation indicating validity of the device, transmitting a new device identity to the device.

In some embodiments, the device is in a locked state and does not accept a new device identity prior to the vendor server validating the NAS to the device and validating the NAS to the device includes communicating user authorization packets between the vendor server and the device, where contents of a payload of each user authorization packet are inaccessible to the NAS, receiving notification from the device that the new device identity has been accepted by the device, and proceeding with a network identity bootstrap process for the device. In other embodiments, the program code is further configured to be executable by a processor to perform operations that include, in response to the vendor server communicating user non-authorization to the device, receiving notification from the device that the new device identity has not been accepted by the device, where the network identity bootstrap process for the device is halted, and in response to the device attestation including an indication of invalidity of the device, preventing transmitting the new device identity to the device. In other embodiments, the device and the NAS communicate over a link layer and wherein the NAS and the vendor server communicate using an Internet protocol over a computer network. In other embodiments, authenticating the vendor using the vendor network address includes the NAS communicating with the vendor server using a security protocol and/or verifying a digital certificate of the vendor.

FIG. 1 is a schematic block diagram illustrating one embodiment of a system 100 for cloud assisted authorization of IoT identity bootstrapping. The system 100 includes a network access server ("NAS") connected IoT devices 104a-f though a LAN 106 and to a vendor server 108 of a vendor 109 over a computer network 110 that includes the Internet, which are described below.

The NAS 102 of a user 114 is a device that connects computing equipment of the user 114 to the Internet. In some embodiments, the NAS 102 is a router, such as a Wi-Fi router, wired router, etc. In some embodiments, the NAS 102 creates a LAN 106 that connects to one or more computing devices 112 of the user 114, such as laptop computers, desktop computers, tablet computers, to one or more smartphones, to entertainment equipment, such as a set-top box, a gaming device, etc., to one or more IoT devices 104, and the like. The connections may be wired or wireless. Typically, the user 114 manages the NAS 102 through a computing device 112, such as a laptop computer, desktop computer, a smartphone, etc. The user 114, in some embodiments, communicates with the vendor 109 through the computing device 112, NAS 102 and vendor server 108. For example, the user 114 may engage the vendor 109 over a website of the vendor, an application of the vendor 109 installed on the computing device 112, etc.

The wireless connection may employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™. The wireless connection may be a mobile telephone network.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Typically, the NAS 102 has an internet protocol ("IP") address and devices connected to the NAS 102 through the LAN 106 are shielded from the computer network 110 and must have permission of the NAS 102 to connect to the Internet. However, some devices connected to the NAS 102 through the LAN 106 are able to acquire Internet access and can access devices on the LAN 106 in a way that allows unauthorized people or organizations to steal a user's private information from a device connected to the LAN 106, install viruses, encrypt the user's information and demand to be paid to unencrypt the information, and other unwanted action. The IoT devices 104 may also create security hazards and the embodiments described herein are useful in preventing unauthorized access to a user's devices and information by authorizing the IoT devices 104 to the NAS 102, authorizing the user 114 to the IoT devices 104, and authorizing the vendor server 108 to the NAS 102 and/or the IoT devices 104.

The IoT devices 104 may include a security camera 104a, a remote control 104b, a speaker 104c, a personal data device ("PDA") 104d, a doorbell/camera 104e, a motion sensor 104f, appliances (not shown), printers (not shown) or other device installed by a user that has a capability of Internet or network access. IoT devices 104, such as consumer electronics owned by a user, such as in a smart-home environment, are typically not initially equipped with a digital identity of the NAS 102. Before being permitted access to the user's LAN 106, an IoT device is typically imprinted with a digital identity provided by the NAS 102, which may include cryptographic keys. However, this scenario raises security concerns because an IoT device 104, during an initialization process, authorizes the NAS 102 before accepting a new device identity from the NAS 102 and the NAS 102 is typically required to attest the validity of the IoT device 104 before allowing the IoT device 104 to access the LAN 106. Typically, an IoT device 104 is imprinted with an identity in a vendor's domain. However, counterfeit IoT devices 104 may have an identity that is not known to the vendor and may include malware, viruses or other malicious code that can be used to do damage or steal a user's information.

The vendor server 108 is a computing device connected to the NAS 102 through the computer network 110, and thus the Internet, where the vendor server 108 is authorized by the vendor of an IoT device 104 being installed on the LAN 106. In some embodiments, the vendor manufactured the IoT device 104. In other embodiments, the vendor sells IoT devices and sold the IoT device 104 to the user that owns or controls the NAS 102, the LAN 106 and devices connected to the LAN 106. In other embodiments, the vendor purchased the IoT device 104 from a manufacturer in an authorized sale or is an authorized reseller of the IoT device 104. The vendor server 108, in some embodiments, is a computing device controlled or owned by the vendor. The vendor server 108 is able to confirm identity of the IoT device 104 to the NAS 102 and is able to confirm that the NAS 102 is authorized to access and/or use the IoT device 104. In addition, the IoT device 104 and NAS 102 are able to verify that the vendor server 108 is the vendor's authorized server. The vendor server 108 may be a rack-mounted server, a workstation, a desktop computer, etc. and may be a cloud-based server. The vendor server 108 is accessible via an IP address or similar address accessed through the Internet.

The computer network 110 may include a wired network, a wireless connection, a LAN, a WAN, a fiber optic network, etc. and may include one or more computing networks. The computer network 110 includes the Internet. The computer network 110 may include cables, routers, switches, servers, and the like. The NAS 102 includes a NAS attestation apparatus 150, the IoT devices 104 include an IoT attestation apparatus 160 and the vendor server 108 includes a vendor attestation apparatus 170, which are described below with respect to the apparatuses 200, 300, 400, 500, 600 of FIGS. 2-6.

Figure 2:
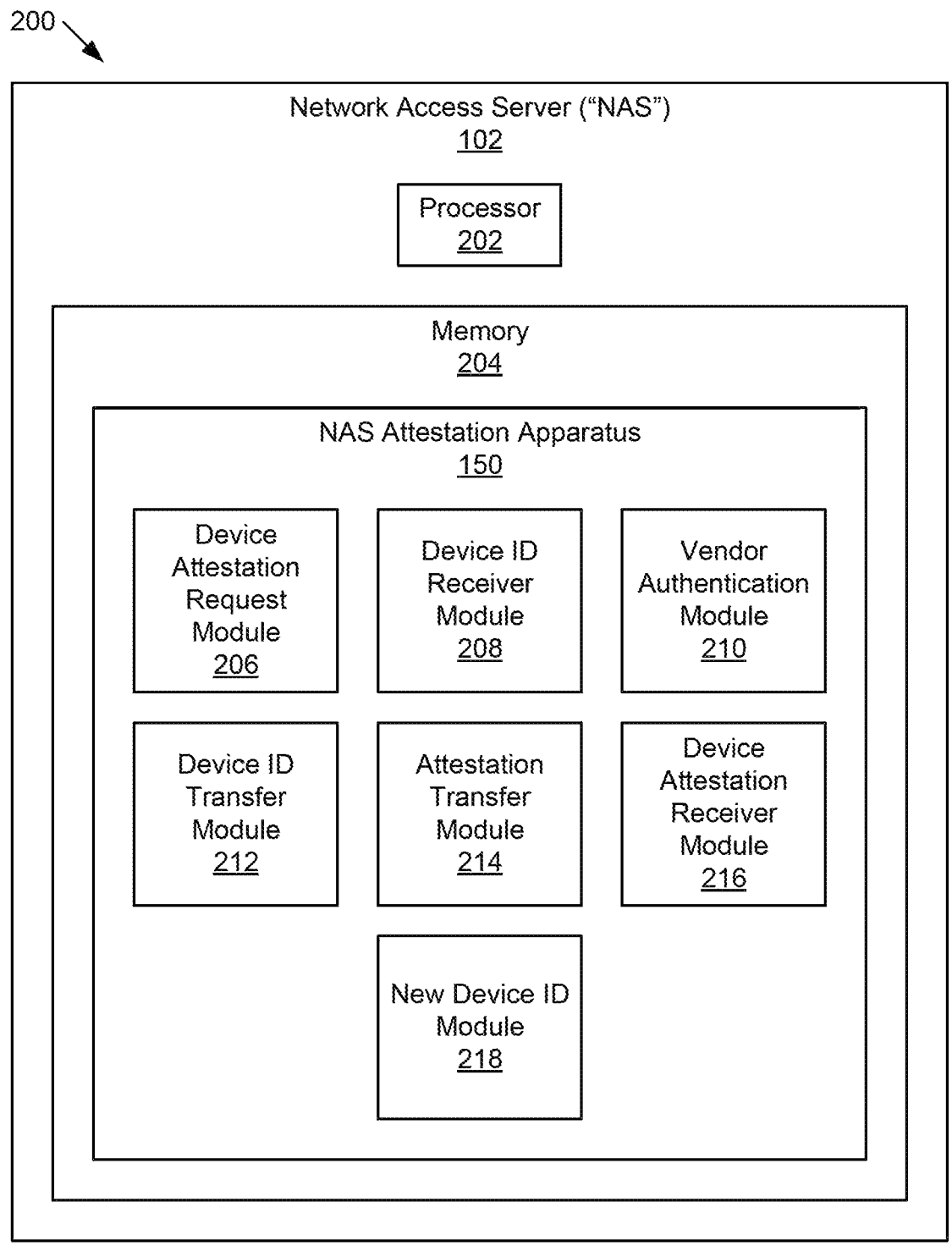
FIG. 2 is a schematic block diagram illustrating one embodiment of an apparatus with a network access server ("NAS") for cloud assisted authorization of IoT identity bootstrapping.

FIG. 2 is a schematic block diagram illustrating one embodiment of an apparatus 200 with a NAS 102 for cloud assisted authorization of IoT identity bootstrapping. The apparatus 200 includes a NAS 102 with a processor 202 and memory 204. The memory 204 includes an embodiment of a NAS attestation apparatus 150 that includes a device attestation request module 206, a device ID receiver module 208, a vendor authentication module 210, a device ID transfer module 212, an attestation transfer module 214, a device attestation receiver module 216 and a new device ID module 218, which are described below. In some embodiments, the NAS attestation apparatus 150 is program code stored in memory 204 and executable on the processor 202. In other embodiments, the NAS attestation apparatus 150 is implemented in other ways, such as in a programmable hardware device. Some portions or all of the NAS attestation apparatus 150 may also be implemented in hardware circuits.

The NAS attestation apparatus 150 includes a device attestation request module 206 that sends a device attestation request to a device. The device is capable of connection to a computer network accessible by the NAS 102. In some embodiments, the device is an IoT device 104. For simplicity, the device is described herein as an IoT device 104, but may be any device that is capable of connection to a computer network accessible by the NAS 102, such as the LAN 106. The device attestation request is sent by the NAS 102 to the IoT device 104 through the LAN 106. The device attestation request is typically sent when the IoT device 104 is first connected to the LAN 106. In some embodiments, the NAS 102 prevents the IoT device 104 from communicating with other devices connected to the LAN 106 with some exceptions, such as communication to authenticate the NAS 102.

The device attestation request, in some embodiments, is of a specific type that is recognized by IoT devices 104 as a request for information from the IoT device 104 during an initial part of a bootstrapping process that authorizes and enables the IoT device 104. In other embodiments, the device attestation request is formatted specifically for the IoT device 104. For example, the device attestation request may be initiated by the user 114 purchasing the IoT device 104. An application of the vendor 109 may be sent to or downloaded by the computing device 112 of the user 114 from a known vendor's website or the user 114 may access the vendor's website. The user 114 may initiate registration of the IoT device 104 through the application or website, which may then initiate the device attestation request. For example, if the IoT device 104 is marked with Lenovo® indicating that the IoT device 104 is made by Lenovo, the user may visit a Lenovo website to register the IoT device 104 or to download software, firmware, etc. for the IoT device 104 that may initiate the device attestation request.

In some embodiments, the NAS 102 initially limits network access of the IoT device 104 where the device attestation request merely triggers the IoT device 104 to send particular information. For example, in response to the device attestation request, the IoT device 104 provides a device identifier of the IoT device 104 and a vendor network address of the vendor server 108. The IoT device 104 may also send other related information.

In some embodiments, the NAS 102 communicates with the IoT device 104 over a link layer. For example, the link layer may be a data link layer that is part of the Open Systems Interconnection ("OSI") network model. In another embodiment, the link layer is in the Transmission Control Protocol/Internet Protocol ("TCP/IP"). Communication using a link layer, in some embodiments, restricts communication with the IoT device 104 and provides a level of security. In some embodiments, the NAS 102 communicates with the IoT device 104 over a link layer until completion of a bootstrapping process of the IoT device 104, which opens up communication possibilities of the IoT device 104.

The NAS attestation apparatus 150 includes a device ID receiver module 208 that receives from the IoT device 104, at the NAS 102 of the user 114, a vendor network address of a vendor server 108 of a vendor 109 and a device identifier for the IoT device 104. The vendor network address, in some embodiments, is an internet address. For example, the vendor network address may be a Uniform Resource Identifier ("URI"). In other embodiments, the vendor network address is accompanied by other relevant information that permits contact with the vendor server 108 in a way such that the vendor server 108 is able to recognize that the NAS 102 is seeking to authenticate the IoT device 104.

The device identifier is an identifier of the IoT device 104 that is known to the vendor so that the vendor recognizes the IoT device 104. The device identifier, in some embodiments, is a unique identifier. In other embodiments, the device identifier is unique to the vendor. In other embodiments, the device identifier is a media access control ("MAC") address, which is a unique identifier assigned to a network interface card ("NIC") for use as a network address in communications within a network segment. In some embodiments, the MAC address is used within the OSI network model and in the media access control protocol sublayer of the data link layer. The MAC address, in some embodiments is assigned by a manufacturer of the IoT device 104 and may be referred to as a burned-in address, an Ethernet hardware address, a hardware address or a physical address. In some embodiments, the IoT device 104 supports changing of the MAC address or other device identifier. One of skill in the art will recognize other suitable device identifiers and characteristics of the device identifier. The network address, device identifier and any other relevant information sent by the IoT device 104 and received by the device ID receiver module 208 are sufficient for the vendor server 108 to attempt to authenticate the IoT device 104 for authentication.

The NAS attestation apparatus 150 includes a vendor authentication module 210 that authenticates the vendor 109 using the vendor network address. The vendor authentication module 210 uses the vendor network address for authentication by accessing the vendor server 108 using the vendor network address. Once the vendor authentication module 210 initiates contact with the vendor server 108 of the vendor 109, the vendor module 210 may then initiate a vendor authorization process. In some embodiments, the vendor authentication module 210 authenticates the vendor 109 using a digital certificate of the vendor 109 from the vendor server 108. For example, when the NAS 102 uses the vendor network address to access the vendor server 108, the vendor server 108 responds with a digital certificate of the vendor 109 that may be used by the NAS 102 and vendor server 108 to securely exchange data over the computer network 110/Internet using a public key infrastructure ("PKI"). The digital certificate may also be called a public key certificate or an identity certificate. Where a digital certificate is used, the NAS 102 is able to verify the identity of the vendor 109. For example, a subject of the digital certificate may include a vendor identifier that matches the host name, i.e. domain name, to which the NAS 102 is trying to connect. The digital certificate may also be signed by a trusted certificate authority, which may also be used by the vendor authentication module 210 to verify that the vendor server 108 is authentic and authorized by the vendor 109. In other embodiments, the vendor authentication module 210 uses another security protocol to verify that the vendor server 108 is authentic and authorized by the vendor 109.

The NAS attestation apparatus 150 includes a device ID transfer module 212 that, in response to authenticating the vendor 109, sends the device identifier to the vendor server 108. The NAS 102 uses the vendor network address to communicate with the vendor server 108 and to send the device identifier received from the IoT device 104 to the vendor server 108. In some embodiments, when the vendor server 108 receives the device identifier, the vendor server 108 starts a device attestation process to validate the IoT device 104.

The NAS attestation apparatus 150 includes an attestation transfer module 214 that communicates device attestation packets between the vendor server 108 and the IoT device 104. Contents of a payload of the device attestation packets are inaccessible to the NAS 102 and the device attestation packets validate the IoT device 104 to the vendor server 108. The attestation transfer module 214 transfers the device attestation packets between the vendor server 108 and the IoT device 104 without being able to view contents of the payloads of the packets, which allows the device attestation process to be secure between the IoT device 104 and the vendor server 108. For example, the IoT device 104 and the vendor server 108 may communicate device attestation packets in a secure process where the device attestation packets are encrypted. The device attestation process allows the vendor server 108 to verify that the IoT device 104 is authentic and has not been tampered with by another party.

Initially, the vendor server 108 is able to determine if the device identifier sent by the IoT device 104 to the NAS 102 and forwarded by the NAS 102 to the vendor server 108 is known to the vendor. The device attestation packets communicated by the attestation transfer module 214 allows the vendor server 108 to request additional information from the IoT device 104, such as a cryptographic key or other identifying information of the IoT device 104 so that the vendor server 108 is satisfied that the IoT device 104 is authentic and has not been tampered with.

The NAS attestation apparatus 150 includes a device attestation receiver module 216 that receives device attestation from the vendor server 108. The device attestation indicates validity status of the device to the NAS 102. Once the device attestation process is complete, the vendor server 108 transmits the device attestation to the NAS 102. The device attestation indicates either validity of the IoT device 104 or invalidity of the IoT device 104. For example, if the vendor server 108 detects that the IoT device 104 is counterfeit, has been tampered with, or otherwise fails the device attestation process, the vendor server 108 sends a device attestation to the NAS 102 indicating that the IoT device 104 is not valid. If the vendor server 108 determines, through the device attestation process, that the IoT device 104 is valid, the vendor server 108 sends a device attestation to the NAS 102 that indicates that the IoT device 104 is valid.

The NAS attestation apparatus 150 includes a new device ID module 218 that, in response to the device attestation indicating validity of the IoT device 104, transmits a new device identity to the IoT device 104. The new device identity, in some embodiments, replaces a current device identity of the IoT device 104. In some embodiments, the new device ID module 218 imprints the new device identity on the IoT device 104, which signifies that the NAS 102 accepts the IoT device 104 to enable the IoT device 104 to access devices on the LAN 106, to access the NAS 102 and/or to access the computer network 110 connected to the NAS 102, including the Internet. The new device identity is known to the NAS 102 and enables a bootstrapping process to continue. The bootstrapping process sets up the IoT device 104 for communication with other devices on the LAN 106 and the NAS 102 and to operate as intended.

In some embodiments, the device attestation includes an indication of invalidity of the IoT device 104 and the new device ID module 218 prevents transmission of the new device identity to the IoT device 104. For example, the vendor server 108 may determine that the IoT device 104 is invalid so the vendor server 108 transmits to the NAS 102 a device attestation that include an indication of invalidity of the IoT device 104.

Figure 3:
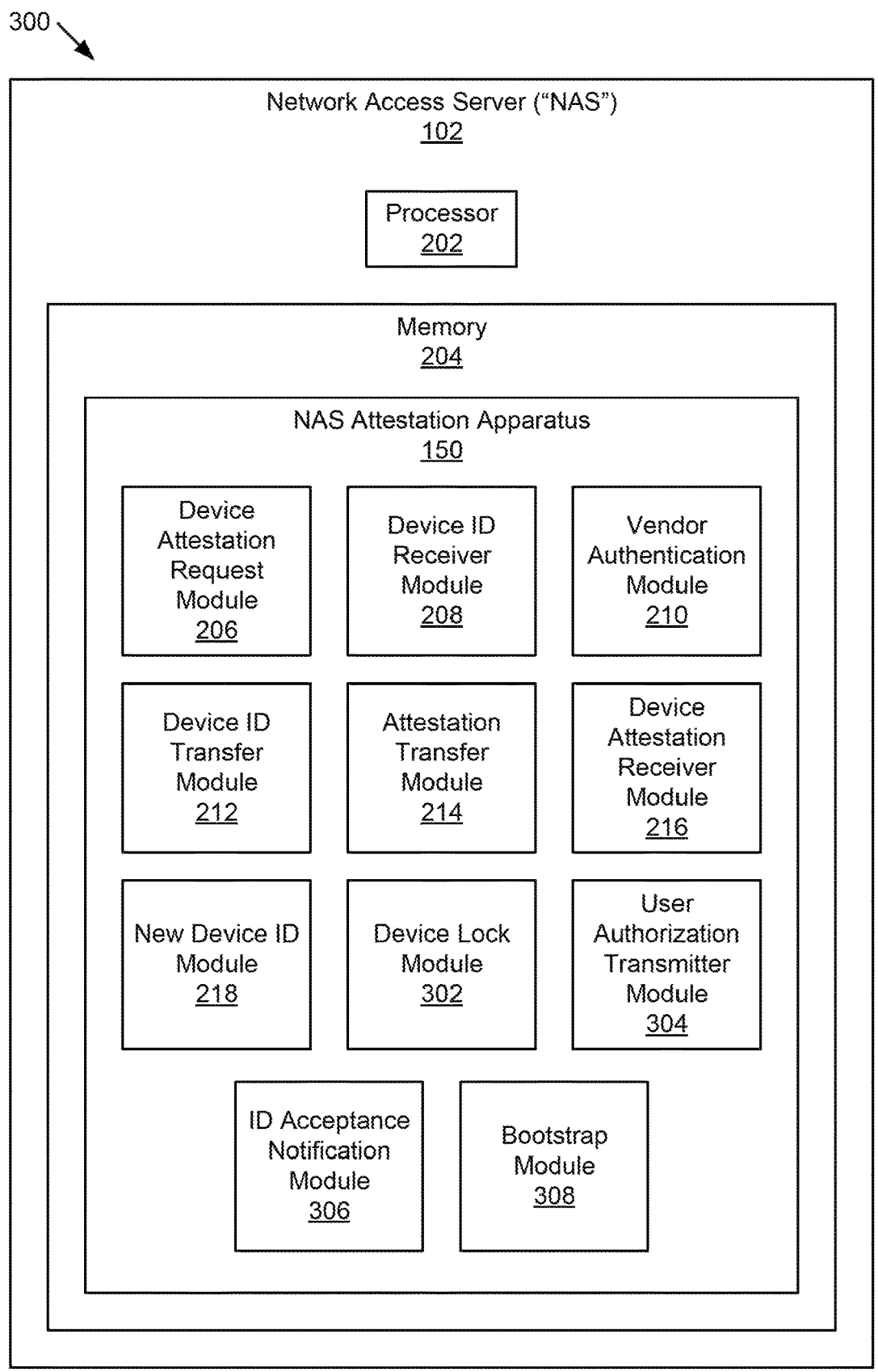
FIG. 3 is a schematic block diagram illustrating another embodiment of an apparatus with a NAS for cloud assisted authorization of IoT identity bootstrapping.

FIG. 3 is a schematic block diagram illustrating another embodiment of an apparatus 300 with a NAS 102 for cloud assisted authorization of IoT identity bootstrapping. The apparatus 300 includes a NAS 102 with a processor 202 and memory 204. The memory 204 includes another embodiment of a NAS attestation apparatus 150 that includes a device attestation request module 206, a device ID receiver module 208, a vendor authentication module 210, a device ID transfer module 212, an attestation transfer module 214, a device attestation receiver module 216 and a new device ID module 218, which are substantially similar to those described above in relation to the apparatus 200 of FIG. 2. The NAS attestation apparatus 150 may also include a device lock module 302, a user authorization transmitter module 304, an ID acceptance notification module 306 and/or a bootstrap module 308, which are described below. As with the apparatus 200 of FIG. 2, in some embodiments the NAS attestation apparatus 150 is program code stored in memory 204 and executable on the processor 202. In other embodiments, the NAS attestation apparatus 150 is implemented in other ways, such as in a programmable hardware device. Some portions or all of the NAS attestation apparatus 150 may also be implemented in hardware circuits.

In some embodiments, the NAS attestation apparatus 150 includes a device lock module 302 that determines that the IoT device 104 is in a locked state prior to or in conjunction with the device attestation request module 206 transmitting the attestation request. The IoT device 104, in some embodiments, is locked until the IoT device receives from the vendor server 108 attestation that the NAS 102 is valid. For example, the IoT device 104 may be subject to a user subscription with the vendor, the vendor may have a process to make sure that the user of the NAS 102 purchased the IoT device 104 through proper channels, etc.

In some embodiments, the NAS attestation apparatus 150 includes a user authorization transmitter module 304 that communicates user authorization packets between the vendor server 108 and the IoT device 104 where contents of a payload of each user authorization packet are inaccessible to the NAS 102. For example, the user authorization transmitter module 304 may act in conjunction with the attestation transfer module 214 to communicate the user authorization packets after the vendor server 108 has determined that the IoT device 104 is valid and begins a user attestation process. Once the vendor server 108 has determined that the user 114 is valid and the IoT device 104 is valid, the vendor server 108 communicates with the IoT device 104 to inform the IoT device 104 that the user 114 is valid and the user authorization transmitter module 412 transfers the user authorization packets. Once the vendor server 108 has informed the IoT device 104 that the user 114 is authorized by way of the user authorization packets, the IoT device 104 exits the locked state and is available to communicate with the NAS 102 more than just the vendor network address and the device identifier.

In some embodiments, the NAS attestation apparatus 150 includes an ID acceptance notification module 306 that receives notification from the IoT device 104 that the new device identity has been accepted by the IoT device 104 and a bootstrap module 308 that proceeds with a bootstrapping process to bring the IoT device 104 into service. Once the IoT device 104, in some embodiments, has received a validation of the NAS during the user attestation process and after the IoT device 104 has received a new device identity, the IoT device 104 transmits to the NAS 102 a notification of acceptance of the new device identity. Once the ID acceptance notification module 306 of the NAS 102 has received a notification that the IoT device 104 has accepted the new device identity, the bootstrap module 308 proceeds with the bootstrapping process to bring the IoT device 104 into service.

In some embodiments, the ID acceptance notification module 306 receives a notification from the IoT device 104 that the new device identity has not been accepted, in which case the bootstrap module 308 halts the bootstrap process of the IoT device 104. In this case, the user may seek information from the vendor server 108 as to why the IoT device 104 or the NAS 102 was not validated. For example, the user may need a subscription to use the IoT device 104, may be required to provide proof of purchase of the IoT device 104, etc. to be validated. In another example, the vendor server 108 may notify the user through the NAS 102 that the IoT device 104 is not valid and may provide additional information as to why the IoT device 104 was rejected.

Figure 4:
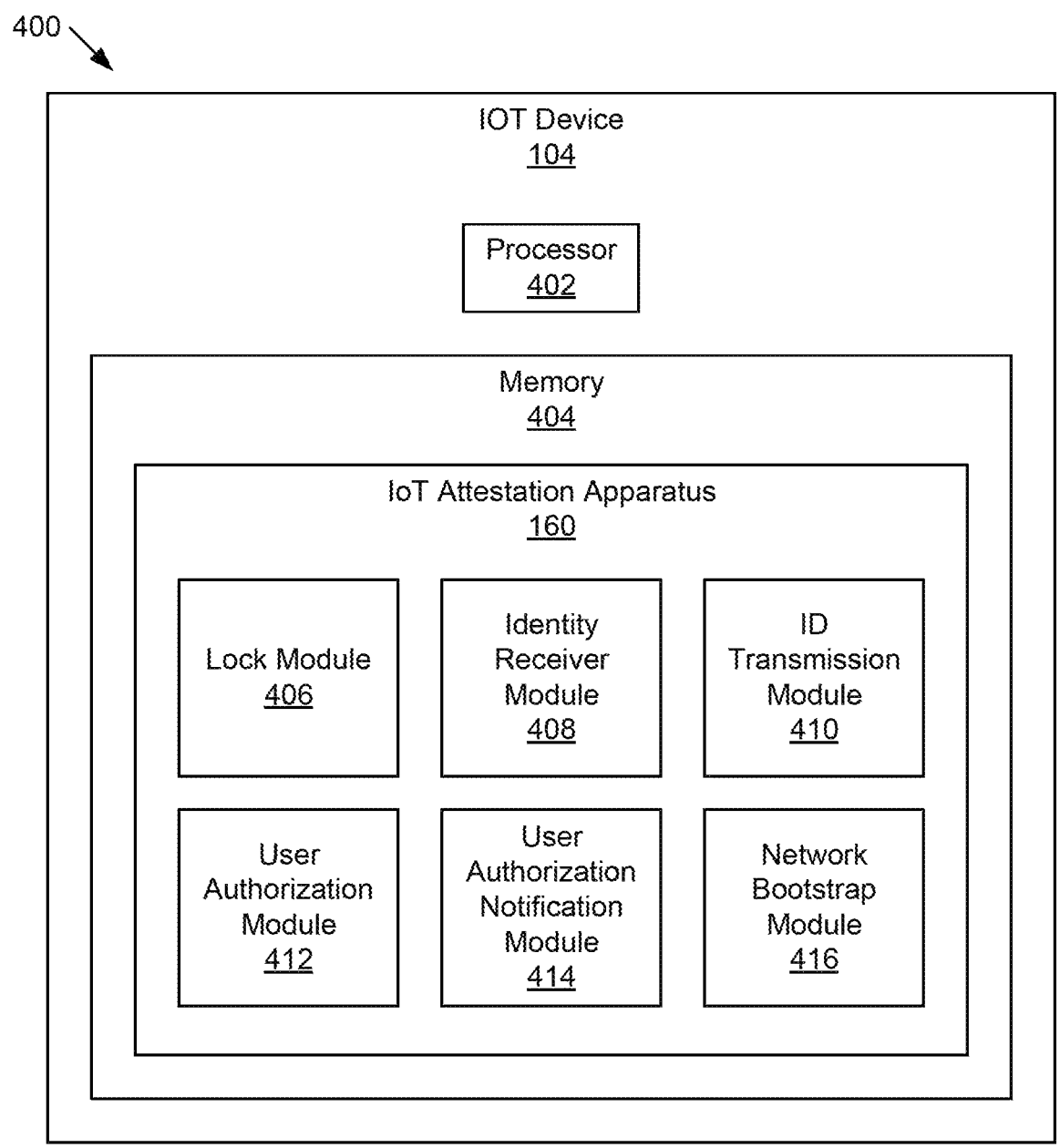
FIG. 4 is a schematic block diagram illustrating one embodiment of an apparatus with an IoT device for cloud assisted authorization of IoT identity bootstrapping.

FIG. 4 is a schematic block diagram illustrating one embodiment of an apparatus 400 with an IoT device 104 for cloud assisted authorization of IoT identity bootstrapping. The apparatus 400 includes an IoT device 104 with a processor 402 and memory 404. The memory 404 includes one embodiment of an IoT attestation apparatus 160 with a lock module 406, an identity receiver module 408, an ID transmission module 410, a user authorization module 412, a user authorization notification module 414, and a network bootstrap module 416, which are described below. In the depicted embodiment, the IoT attestation apparatus 160 is depicted in memory 404 and is program code that is executable on the processor 402. In other embodiments, the IoT attestation apparatus 160 is part of a controller, which may be a micro controller or may be implemented with an FPGA, programmable logic array or other programmable hardware device. In other embodiments, all or a portion of the IoT attestation apparatus 160 is implemented using hardware circuits. For example, the vendor network address and the device identifier may be embedded in firmware on the IoT device 104. One of skill in the art will recognize other ways to implement the IoT attestation apparatus 160.

The IoT attestation apparatus 160 includes a lock module 406 that maintains a device in a locked state. In the embodiments described herein, the device is an IoT device 104, but may include another device. The IoT device 104 is connected to a NAS 102 and the locked state prevents acceptance of a new device identity from the NAS 102 prior to verifying authorization of the user 114.

The IoT attestation apparatus 160 includes an identity receiver module 408 that receives a new device identity from the NAS 102. For example, the NAS 102 may send a new device identity as part of an attestation request. In other embodiments, the NAS 102 sends the new device identity separate from the attestation request and after the NAS 102 receives validation of the IoT device 104 from the vendor server 108.

The IoT attestation apparatus 160 includes an ID transmission module 410 that transmits to the NAS 102 a vendor network address of the vendor server 108 and a device identifier of the IoT device 104. In some embodiments, the ID transmission module 410 transmits the vendor network address and device identifier to the NAS 102 in response to receiving the new device identity from the NAS 102. In another embodiment, the ID transmission module 410 transmits the vendor network address and device identifier in response to an attestation request.

The IoT attestation apparatus 160 includes a user authorization module 412 that communicates user authorization packets with the vendor server 108 through the NAS 102 where contents of a payload of the user authorization packets are inaccessible to the NAS 102. In some embodiments, the vendor server 108 initiates communication of the user authorization packets in a user attestation process after the vendor server 108 receives the device identifier from the NAS 102 and authorizes the user 114. In some embodiments, the vendor server 108 transmits a notification to the IoT device 104 by way of the user authorization packets where the notification includes an indication of authorization or non-authorization of the user 114.

The IoT attestation apparatus 160 includes a user authorization notification module 414 that, in response to receiving from the vendor server 108 an indication of user authorization, transmits a notification to the NAS 102 that the IoT device 104 has accepted the new device identity. In other embodiments, the user authorization notification module 414 prevents acceptance of the new identity in response to a notification from the vendor server 108 indicating that the user 114 is not authorized and the user authorization notification module 414 transmits the notification to the NAS 102 includes that the IoT device 104 has not accepted the new device identity.

The IoT attestation apparatus 160 includes a network bootstrap module 416 that proceeds with a network identity bootstrap process with the NAS 102. For example, if the user authorization notification module 414 transmits a notification to the NAS 102 that the new device identity has been accepted, the NAS 102 may then initiate or continue with a network identity bootstrap process to allow the IoT device 104 to access devices connected to the LAN 106, the NAS 102 and/or the computer network 110, including the Internet.

Figure 5:
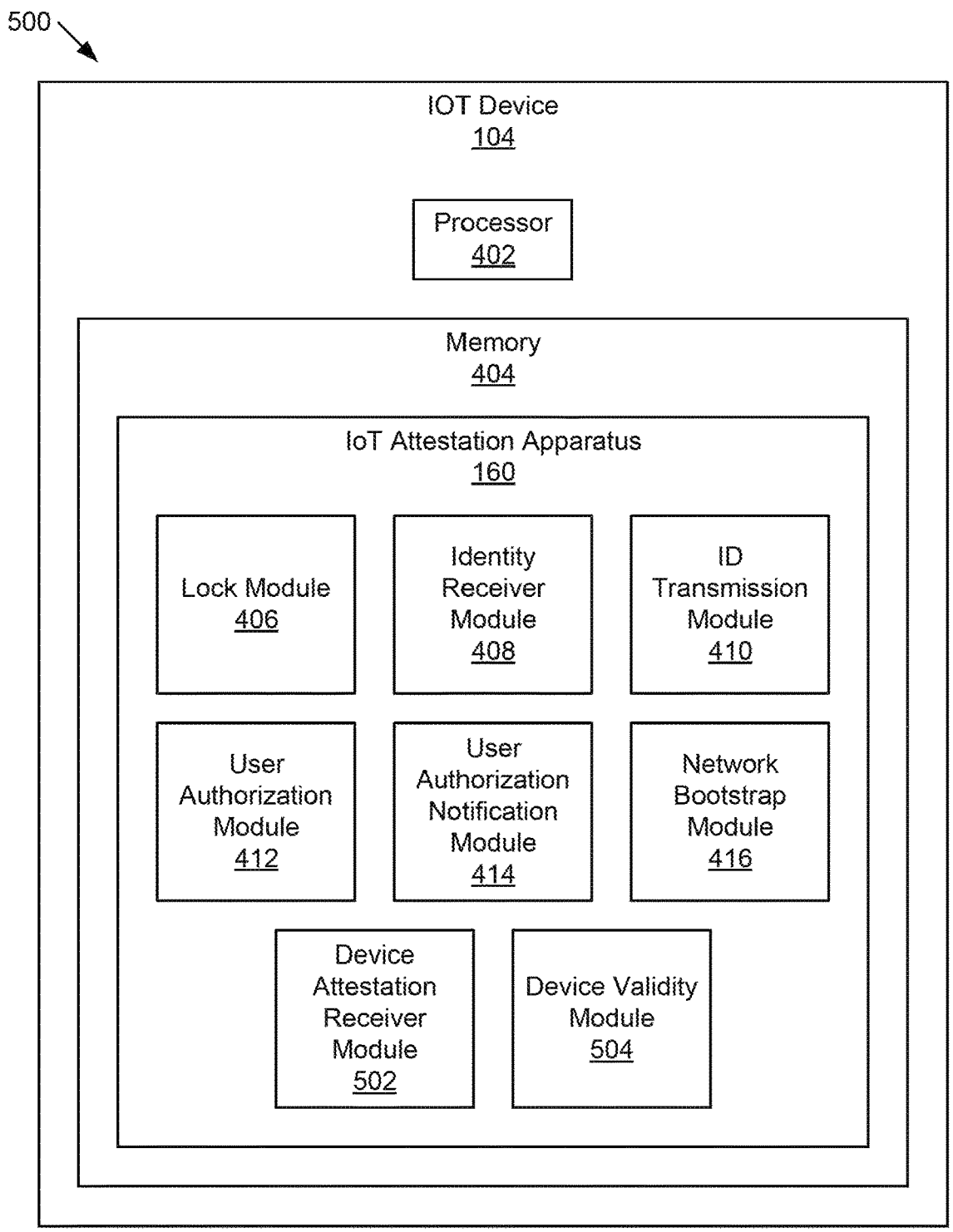
FIG. 5 is a schematic block diagram illustrating another embodiment of an apparatus with an IoT device for cloud assisted authorization of IoT identity bootstrapping.

FIG. 5 is a schematic block diagram illustrating another embodiment of an apparatus 500 with an IoT device 104 for cloud assisted authorization of IoT identity bootstrapping. The apparatus 500 includes an IoT device 104 with a processor 402 and memory 404. The memory 404 includes another embodiment of the IoT attestation apparatus 160 with a lock module 406, an identity receiver module 408, an ID transmission module 410, a user authorization module 412, a user authorization notification module 414, and a network bootstrap module 416, which are substantially similar to those described above in relation to the apparatus 400 of FIG. 4. In various embodiments, the apparatus 500 also includes a device attestation receiver module 502 and/or a device validity module 504.

In the depicted embodiment, the IoT attestation apparatus 160 is depicted in memory 404 and is program code that is executable on the processor 402. In other embodiments, the IoT attestation apparatus 160 is part of a controller, such as an FPGA, programmable logic array or other programmable hardware device. In other embodiments, all or a portion of the IoT attestation apparatus 160 is implemented using hardware circuits. For example, the vendor network address and the device identifier may be embedded in firmware on the IoT device 104. One of skill in the art will recognize other ways to implement the IoT attestation apparatus 160.

The IoT attestation apparatus 160 includes, in some embodiments, a device attestation receiver module 502 that, prior to receiving the new device identity from the NAS 102, receives a device attestation request from the NAS 102. In response, the ID transmission module 410 transmits to the NAS 102 the vendor network address and the device identifier of the device. The device attestation receiver module 502, may be part of a combined attestation process where the NAS 102 validates the IoT device 104 and the IoT device 104 validates the NAS 102.

In the combined attestation process, prior to the user authorization module 412 communicating user authorization packets with the vendor server 108, the device validity module 504 communicates device attestation packets with the vendor server 108 through the NAS 102 where contents of a payload of the device attestation packets are inaccessible to the NAS 102 and the device attestation packets validate the IoT device 104 to the vendor server 108. The device validity module 504 engages in a device attestation process similar to the device attestation process described above with respect to the attestation transfer module 214 of the apparatuses 200, 300 of FIGS. 2 and 3 where the attestation transfer module 214 communicates device attestation packets between the IoT device 104 and the vendor server 108 as the vendor server 108 verifies that the IoT device 104 is valid. The NAS 102 then sends the new device identity to the IoT device 104 through the identity receiver module 408. In some embodiments, the NAS 102 then transmits the new device identity in response to the vendor server 108 validating the IoT device 104 where the new device identity is received by the identity receiver module 408. Where the vendor server 108 does not verify validity of the IoT device 104, the vendor server 108 discontinues communication with the IoT device 104 and/or notifies the NAS 102 of the IoT device invalidity.

Figure 6:
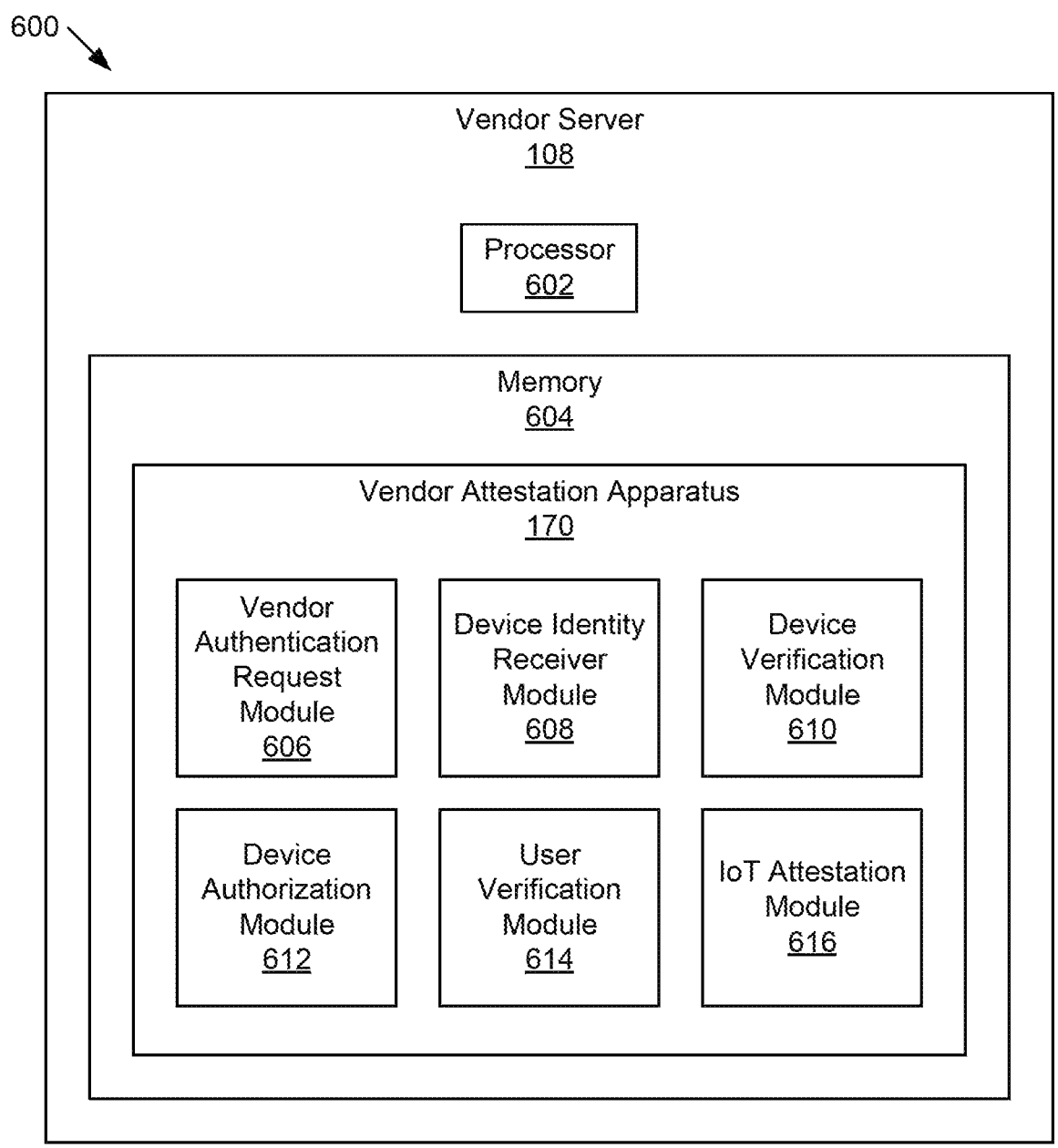
FIG. 6 is a schematic block diagram illustrating another embodiment of an apparatus with a vendor server for cloud assisted authorization of IoT identity bootstrapping.

FIG. 6 is a schematic block diagram illustrating another embodiment of an apparatus 600 with a vendor server 108 for cloud assisted authorization of IoT identity bootstrapping. The apparatus 600 includes a vendor server 108 with a processor 602 and memory 604. The memory 604 includes an embodiment of a vendor attestation apparatus 170 with a vendor authentication request module 606, a device identity receiver module 608, a device verification module 610, a device authorization module 612, a user verification module 614 and/or a IoT attestation module 616, which are described below. In the depicted embodiment, the vendor attestation apparatus 170 is depicted in memory 604 and is program code that is executable on the processor 602. For example, the vendor attestation apparatus 170 may be part of cloud computing services. In other embodiments, all or a portion of the vendor attestation apparatus 170 is implemented by a programmable hardware device and/or hardware circuits.

The vendor attestation apparatus 170, in some embodiments, includes a vendor authentication request module 606 that receives, at the vendor server 108, a request for authentication of the vendor 109 from the NAS 102 and communicates with the NAS 102 identity information to validate the vendor 109 to the NAS 102. In response to the request for authentication from the NAS 102, in some embodiments, the vendor authentication request module 606 sends a digital certificate of the vendor 109 to the NAS 102 and engages in a process with the NAS 102 using the digital certificate to verify that the vendor 109 is authentic. In other embodiments, the vendor authentication request module 606 uses a different security process to engage with the NAS 102 and validate the vendor 109 to the NAS 102.

The vendor attestation apparatus 170, in some embodiments, includes a device identity receiver module 608 that receives from the NAS 102 a device identity, which was sent to the NAS 102 by the IoT device 104. Once the device identity receiver module 608 has received the device identity, a device verification module 610 starts a device attestation process with the IoT device 104. The device attestation process, in some embodiments, includes the device verification module 610 verifying that the device identifier is known to the vendor 109 and/or vendor server 108. The device verification module 610 communicates device attestation packets with the IoT device 104 through the NAS 102 to validate the IoT device 104.

The vendor attestation apparatus 170, in some embodiments, includes a device authorization module 612 that transmits an IoT device validity notification to the NAS 102 in response to the device verification module 610 validating the IoT device 104. The device authorization module 612 transmits that the IoT device 104 is valid or invalid to the NAS 102. If the device verification module 610 determines that the IoT device 104 is valid, the device authorization module 612 transmits a notification to the NAS 102 that the IoT device 104 is valid. If the device verification module 610 determines that the IoT device 104 is invalid, the device authorization module 612 transmits a notification to the NAS 102 that the IoT device 104 is invalid. For example, the device authorization module 612 may authorize the user 114 by verifying that the user 114 has a subscription to use the IoT device 104, has purchased the IoT device 104 from an authorized dealer, etc.

The vendor attestation apparatus 170, in some embodiments, includes a user verification module 614 that authorizes the user 114 in response to the device verification module 610 validating the IoT device 104. The user verification module 614 authorizes the user 114 by determining if the user 114 is authorized to use the IoT device 104. For example, the user verification module 614 may authorize the user 114 by verifying that the user 114 has a subscription to use the IoT device 104, has purchased the IoT device 104 from an authorized dealer, etc. In some embodiments, the user verification module 614 uses communication channels different than the connection between the NAS 102 and the vendor server 108. For example, the vendor 109 may communicate with the user 114 over a cellular phone via text, email, etc. to authorize the user 114. In some examples, the vendor 109 may authorize the user 114 using a 2-step authentication process. In some embodiments, the vendor 109 authorizes the user 114 via a vendor website, a challenge email, a passcode sends to the cell phone of the user 114, etc.

The vendor attestation apparatus 170, in some embodiments, includes a IoT attestation module 616 that engages in a user attestation process with the IoT device 104 to authorize the user 114 to the IoT device 104. In one example, the IoT attestation module 616 sends a notification to the IoT device 104 that the user 114 is authorized. The IoT device 104 may then accept a new device identity from the NAS 102. In another example, the IoT attestation module 616 sends a notification to the IoT device 104 that the user 114 is not authorized, in which case the IoT device 104 takes action, such as not accepting a new device identity received from the NAS 102, not communicating with the NAS 102, etc.

Figure 7:
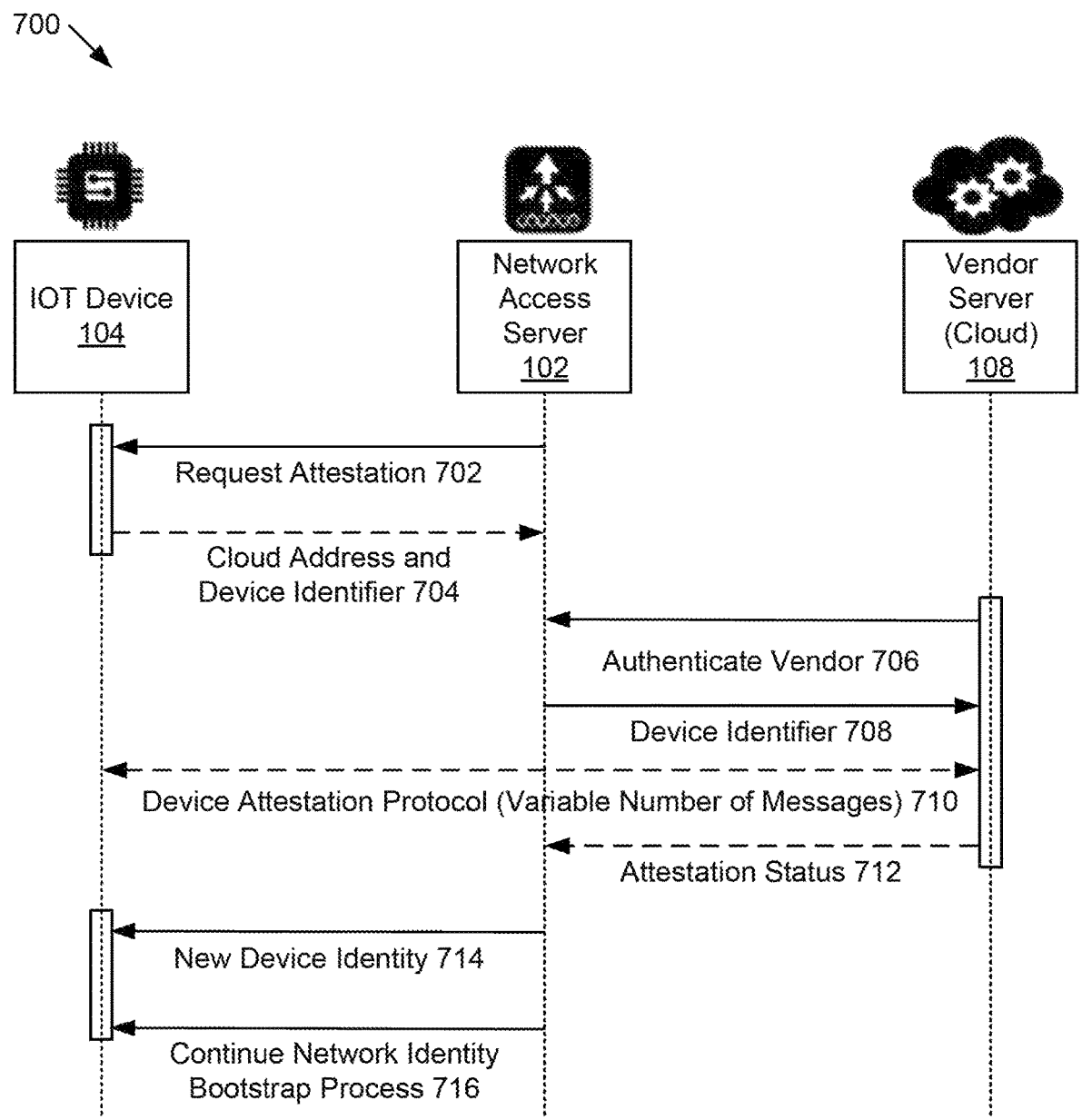
FIG. 7 is a schematic flow chart diagram illustrating one embodiment of a method for cloud assisted authorization of IoT identity bootstrapping where a NAS authorizes an IoT device.

FIG. 7 is a schematic flow chart diagram illustrating one embodiment of a method 700 for cloud assisted authorization of IoT identity bootstrapping where a NAS 102 authorizes an IoT device 104. The method 700 begins and the NAS 102 sends 702 a device attestation request to the IoT device 104. The IoT device 104 is connected to the NAS 102 over a LAN 106. In other embodiments, the method 700 sends 702 a device attestation request to another type of device connected to the NAS 102 over the LAN 106. In some embodiments, the method 700 sends 702 the device attestation request over a link layer.

The method 700 receives 704 from the IoT device 104, at the NAS 102, a vendor network address of a vendor server 108 of a vendor 109 and a device identifier of the IoT device 104. The method 700 authenticates 706 the vendor 109 using the vendor network address. For example, the method 700 uses the vendor network address to communicate with the vendor server 108 to engage in a vendor authorization process. In some embodiments, the method 700 authenticates 706 the vendor 109 using a digital certificate of the vendor 109 received from the vendor server 108. In other embodiments, the method 700 authenticates 706 the vendor 109 using another security method. The method 700, in response to authenticating 706 the vendor 109, sends 708 the device identifier to the vendor server 108. Where the method 700 cannot authenticate 706 the vendor 109, the method 700 ends. The method 700 communicates 710 device attestation packets between the vendor server 108 and the IoT device 104. Contents of s payload of the device attestation packets are inaccessible to the NAS 102 and the device attestation packets validate the IoT device 104 to the vendor server 108.

The method 700 receives 712 device attestation from the vendor server 108. The device attestation indicates validity status of the device to the NAS 102. Once the device attestation process is complete, the vendor server 108 transmits the device attestation to the NAS 102. The method 700, in response to the device attestation indicating validity of the IoT device 104, transmits 714 a new device identity to the IoT device 104 and continues 716 with a network identity bootstrap process, and the method 700 ends. In various embodiments, all or part of the method 700 is implemented with the device attestation request module 206, the device ID receiver module 208, the vendor authentication module 210, the device ID transfer module 212, the attestation transfer module 214, the device attestation receiver module 216, the new device ID module 218 and/or the bootstrap module 308.

Figure 8:
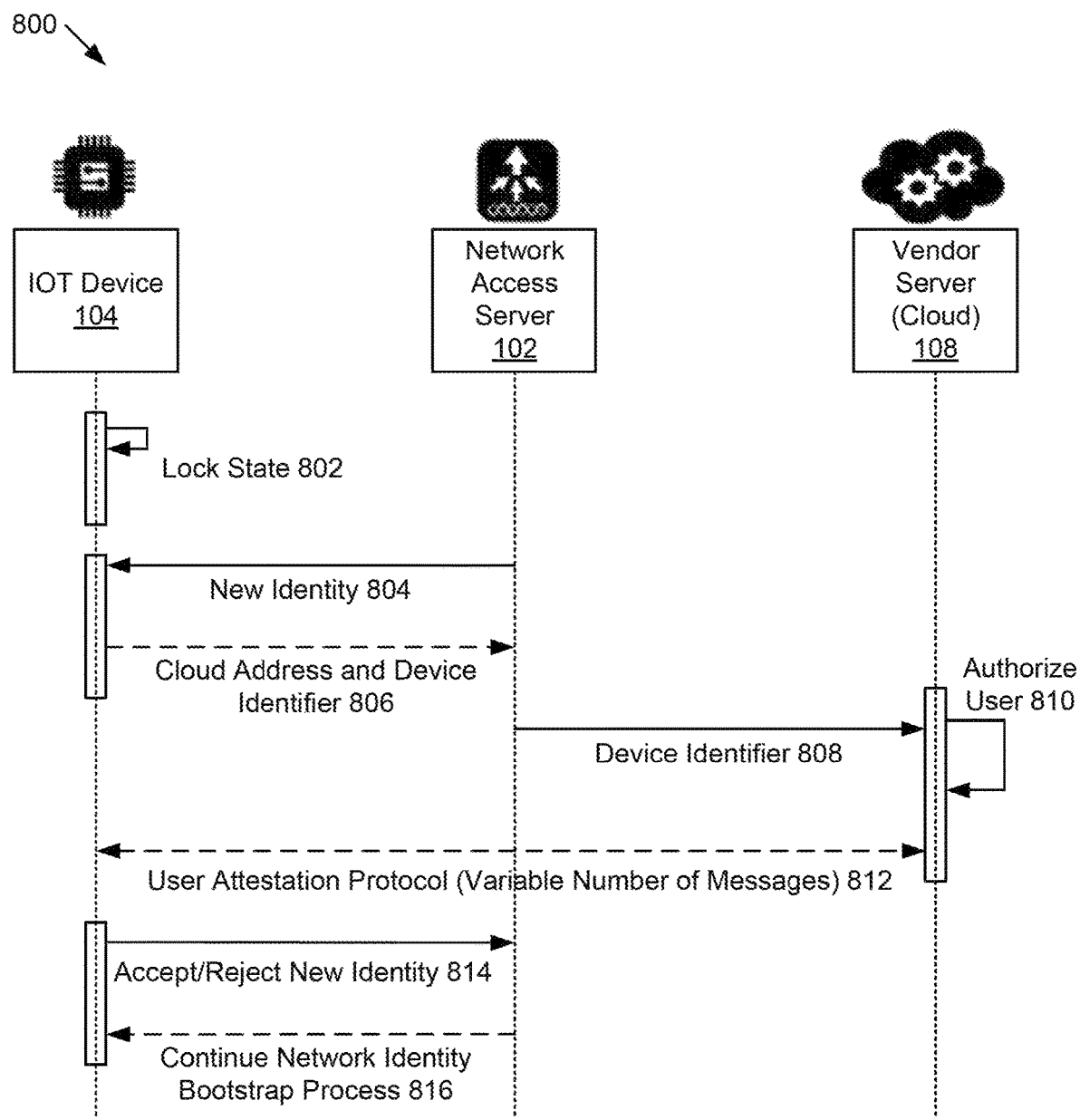
FIG. 8 is a schematic flow chart diagram illustrating one embodiment of a method for cloud assisted authorization of IoT identity bootstrapping where an IoT device authorizes a user.

FIG. 8 is a schematic flow chart diagram illustrating one embodiment of a method 800 for cloud assisted authorization of IoT identity bootstrapping where an IoT device 104 authorizes a user 114. The method 800 begins and maintains 802 the IoT device 104 in a locked state. The IoT device 104 is connected to a NAS 102 and the locked state prevents acceptance of a new device identity from the NAS 102 prior to verifying authorization of the user 114. The method 800 receives 804 a new device identity from the NAS 102. For example, the NAS 102 may send a new device identity as part of an attestation request. The method 800 transmits 806 to the NAS 102 a vendor network address of the vendor server 108 and a device identifier of the IoT device 104. In some embodiments, method 800 transmits the vendor network address and device identifier to the NAS 102 in response to receiving the new device identity from the NAS 102.

The method 800 sends 808 the device identifier to the vendor server 108. The NAS 102 uses the vendor network address to communication with the vendor server 108 and to send 808 the device identifier received from the IoT device 104 to the vendor server 108. In some embodiments, when the vendor server 108 receives the device identifier, the vendor server 108 starts a device attestation process to validate the IoT device 104. The method 800 authorizes 810 the user 114. For example, the method 800 authorizes 810 the user 114 by determining if the user 114 is authorized to use the IoT device 104. For example, the method 800 may authorize 810 the user 114 by verifying that the user 114 has a subscription to use the IoT device 104, has purchased the IoT device 104 from an authorized dealer, etc.

The method 800 communicates 812 user authorization packets with the vendor server 108 through the NAS 102 where contents of a payload of the user authorization packets are inaccessible to the NAS 102. In some embodiments, the vendor server 108 initiates communication of the user authorization packets in a user attestation process after the vendor server 108 receives 808 the device identifier from the NAS 102 and authorizes 810 the user 114. In some embodiments, the vendor server 108 transmits a notification to the IoT device 104 by way of the user authorization packets where the notification includes an indication of authorization or non-authorization of the user 114.

The method 800, in response to receiving from the vendor server 108 an indication of user authorization, transmits 814 a notification to the NAS 102 that the IoT device 104 has accepted the new device identity. In other embodiments, the method 800 prevents acceptance of the new identity in response to a notification from the vendor server 108 indicating that the user 114 is not authorized and the method 800 transmits 814 the notification to the NAS 102 that includes that the IoT device 104 has not accepted the new device identity.

The method 800, in response to the NAS 102 receiving a notification that the IoT device 104 has accepted the new device identity, proceeds 816 with a network identity bootstrap process with the NAS 102. For example, if the method 800 transmits 814 a notification to the NAS 102 that the new device identity has been accepted, the NAS 102 may then initiate or continue with a network identity bootstrap process to allow the IoT device 104 to access devices connected to the LAN 106, the NAS 102 and/or the computer network 110, including the Internet. In various embodiments, all or a portion of the method 800 is implemented with the lock module 406, the identity receiver module 408, the device ID transfer module 212, the device authorization module 612, ID transmission module 410, a user authorization module 412, a user authorization notification module 414, a network bootstrap module 416, and/or other modules discussed herein.

Figure 9:
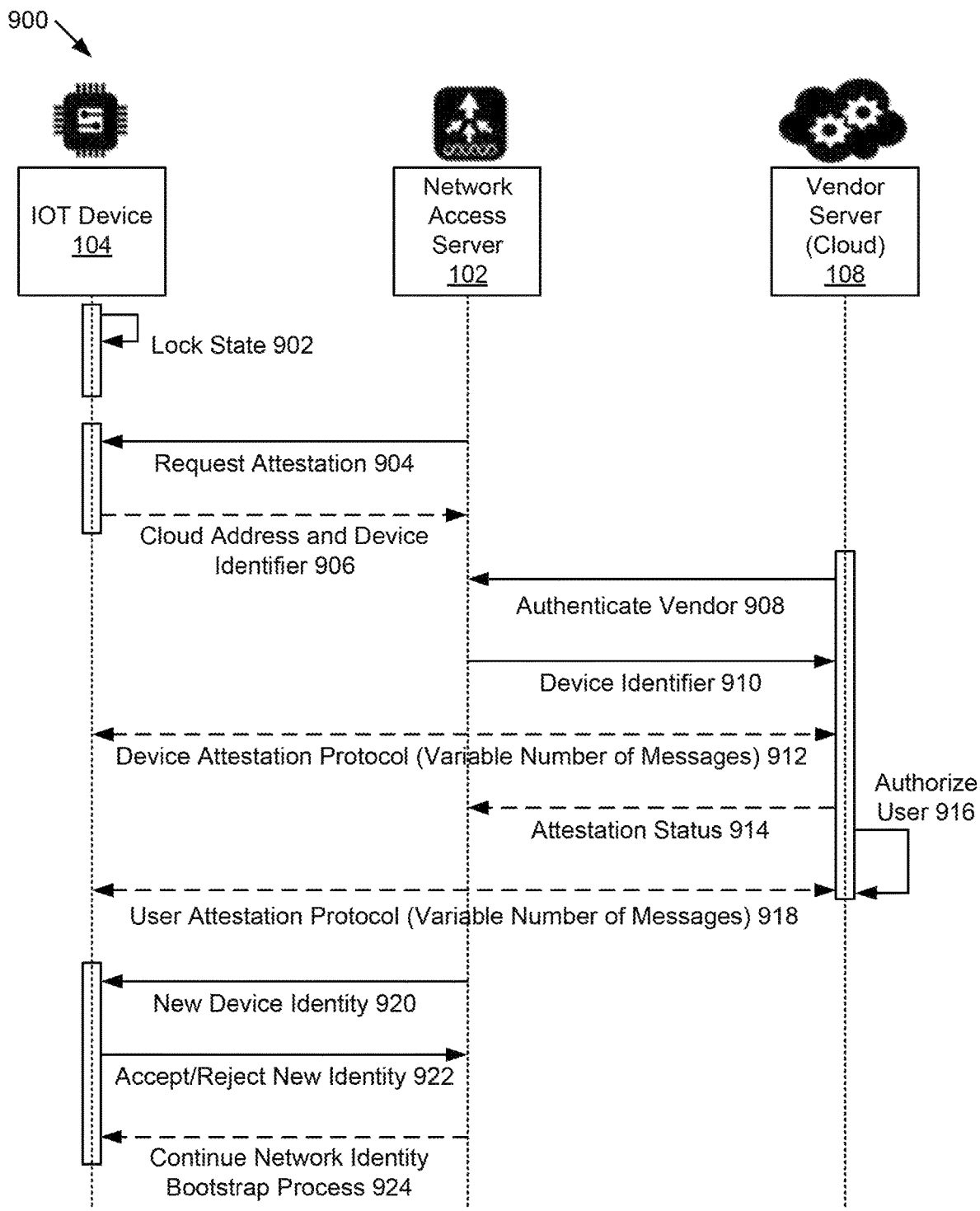
FIG. 9 is a schematic flow chart diagram illustrating one embodiment of a method for cloud assisted authorization of IoT identity bootstrapping where an IoT device and a user authorize each other.

FIG. 9 is a schematic flow chart diagram illustrating one embodiment of a method 900 for cloud assisted authorization of IoT identity bootstrapping where an IoT device 104 and a user 114 authorize each other. The method 900 begins and maintains 902 the IoT device 104 in a locked state. The IoT device 104 is connected to a NAS 102 and the locked state prevents acceptance of a new device identity from the NAS 102 prior to verifying authorization of the user 114. The NAS 102 sends 904 a device attestation request to the IoT device 104 and the IoT device 104 responds by sending 906 a vendor network address of the vendor server 108 and a device identifier of the IoT device 104 to the NAS 102. The NAS 102 authenticates 908 the vendor 109 using the vendor network address. In some embodiments, the NAS 102 authenticates 908 the vendor 109 using a digital certificate of the vendor 109 received from the vendor server 108. In other embodiments, the method 900 authenticates 908 the vendor 109 using another security method.

The method 900, in response to authenticating 908 the vendor 109, causes the NAS 102 to send 910 the device identifier to the vendor server 108. Where the method 900 cannot authenticate 908 the vendor 109, the method 900 ends. The method 900 communicates 912, using the NAS 102, device attestation packets between the vendor server 108 and the IoT device 104. Contents of a payload of the device attestation packets are inaccessible to the NAS 102 and the device attestation packets validate the IoT device 104 to the vendor server 108. The method 900 causes the vendor server 108 to transmit 914 a notification of validity or invalidity of the IoT device 104 to the NAS 102.

In response to the vendor server 108 validating the IoT device 104, the method 900 authorizes 916 the user 114. For example, the method 900 authorizes 916 the user 114 by determining if the user 114 is authorized to use the IoT device 104, by verifying that the user 114 has a subscription to use the IoT device 104, has purchased the IoT device 104 from an authorized dealer, etc.

The method 900 communicates 918 user authorization packets with the vendor server 108 through the NAS 102 where contents of a payload of the user authorization packets are inaccessible to the NAS 102. In some embodiments, the vendor server 108 initiates communication 918 of the user authorization packets in a user attestation process after the vendor server 108 authorizes 916 the user 114. In some embodiments, the vendor server 108 transmits a notification to the IoT device 104 by way of the user authorization packets where the notification includes an indication of authorization or non-authorization of the user 114.

In response to the NAS 102 receiving a notification that the IoT device 104 is authorized, the method 900 causes the NAS 102 to transmit 920 a new device identity to the IoT device 104. In response to the IoT device 104 receiving 912 a notification that the user 114 is authorized and receiving 920 the new device identity, the method 900 causes the IoT device 104 to transmit 814 a notification to the NAS 102 that the IoT device 104 has accepted the new device identity. In other embodiments, the method 900 prevents the IoT device 104 from accepting the new identity in response to a notification from the vendor server 108 indicating that the user 114 is not authorized and the method 900 causes the IoT device 104 to transmit 922 the notification to the NAS 102 that includes that the IoT device 104 has not accepted the new device identity.

The method 900, in response to the NAS 102 receiving a notification that the IoT device 104 has accepted the new device identity, proceeds 924 with a network identity bootstrap process with the NAS 102. In various embodiments, all or a portion of the method 900 is implemented with one or more of the modules 206-218, 302-308, 406-416, 502, 504, 606-618 discussed herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving from a device, at a network access server ("NAS") of a user and in response to an attestation request sent from the NAS to the device, a vendor network address of a vendor server of a vendor and a device identifier for the device, the device capable of connection to a computer network accessible by the NAS;
    authenticating the vendor using the vendor network address;
    in response to authenticating the vendor, sending the device identifier to the vendor server;
    communicating device attestation packets between the vendor server and the device, contents of a payload of the device attestation packets are inaccessible to the NAS, the device attestation packets validating the device to the vendor server;
    receiving device attestation from the vendor server, the device attestation indicating validity status of the device to the NAS; and
    in response to the device attestation indicating validity of the device, transmitting a new device identity to the device,
    wherein authenticating the vendor using the vendor network address comprises the NAS communicating with the vendor server using a security protocol and/or verifying a digital certificate of the vendor.

2. The method of claim 1, wherein the device and the NAS communicate over a link layer and wherein the NAS and the vendor server communicate using an Internet protocol over a computer network.

3. The method of claim 1, wherein the device is in a locked state and does not accept a new device identity prior to the vendor server validating the user to the device.

4. The method of claim 3, wherein validating the user to the device comprises:
    communicating user authorization packets between the vendor server and the device, contents of a payload of each user authorization packet are inaccessible to the NAS;
    receiving notification from the device that the new device identity has been accepted by the device; and
    proceeding with a network identity bootstrap process for the device.

5. The method of claim 4, further comprising, in response to the vendor server communicating user non-authorization to the device, receiving notification from the device that the new device identity has not been accepted by the device, wherein the network identity bootstrap process for the device is halted.

6. The method of claim 1, in response to the device attestation including an indication of invalidity of the device, preventing transmission of the new device identity to the device.

7. The method of claim 1, wherein validating the device to the vendor server comprises the vendor server verifying that the device has a device identity known to the vendor server as a valid device identity.

8. The method of claim 1, wherein the NAS comprises a network communication device connected to the Internet and a communication port connected to the device using a link layer protocol.

9. The method of claim 1, wherein the vendor network address of the vendor server comprises a uniform resource identifier ("URI").

10. A program product comprising a non-transitory computer readable storage medium with program code, the program code being configured to be executable by a processor to perform operations comprising:
    receiving from a device, at a network access server ("NAS") of a user and in response to an attestation request sent from the NAS to the device, a vendor network address of a vendor server of a vendor and a device identifier for the device, the device capable of connection to a computer network accessible by the NAS;
    authenticating the vendor using the vendor network address;
    in response to authenticating the vendor, sending the device identifier to the vendor server;
    communicating device attestation packets between the vendor server and the device, contents of a payload of the device attestation packets are inaccessible to the NAS, the device attestation packets validating the device to the vendor server;
    receiving device attestation from the vendor server, the device attestation indicating validity status of the device to the NAS; and
    in response to the device attestation indicating validity of the device, transmitting a new device identity to the device,
    wherein authenticating the vendor using the vendor network address comprises the NAS communicating with the vendor server using a security protocol and/or verifying a digital certificate of the vendor.

11. The program product of claim 10, wherein the device is in a locked state and does not accept a new device identity prior to the vendor server validating the NAS to the device and wherein validating the NAS to the device comprises:
    communicating user authorization packets between the vendor server and the device, contents of a payload of each user authorization packet are inaccessible to the NAS;
    receiving notification from the device that the new device identity has been accepted by the device; and
    proceeding with a network identity bootstrap process for the device.

12. The program product of claim 11, wherein the program code being further configured to be executable by a processor to perform operations comprising:
    in response to the vendor server communicating user non-authorization to the device, receiving notification from the device that the new device identity has not been accepted by the device, wherein the network identity bootstrap process for the device is halted; and
    in response to the device attestation including an indication of invalidity of the device, preventing transmitting the new device identity to the device.

13. The program product of claim 10, wherein the device and the NAS communicate over a link layer and wherein the NAS and the vendor server communicate using an Internet protocol over a computer network.

* * * * *